Aug. 5, 1969  L. GREGORY, JR  3,458,968
DISPENSING AND FEED MECHANISM
Filed Nov. 16, 1966  3 Sheets-Sheet 1

INVENTOR
Lester Gregory, Jr.

BY Shoemaker and Mattare
ATTORNEYS

Aug. 5, 1969 — L. GREGORY, JR — 3,458,968
DISPENSING AND FEED MECHANISM
Filed Nov. 16, 1966 — 3 Sheets-Sheet 2

INVENTOR
Lester Gregory, Jr.

BY Shoemaker and Mattare
ATTORNEYS

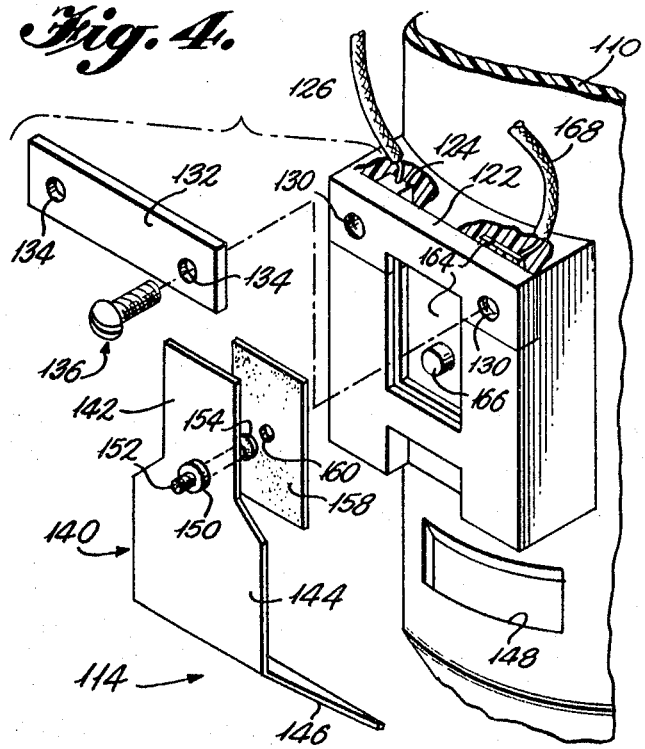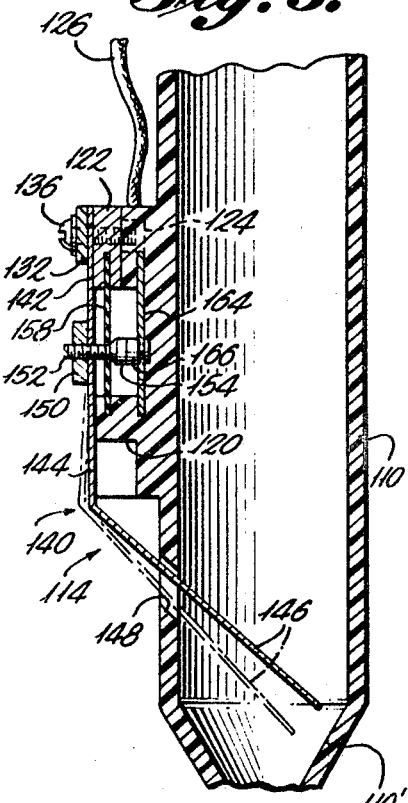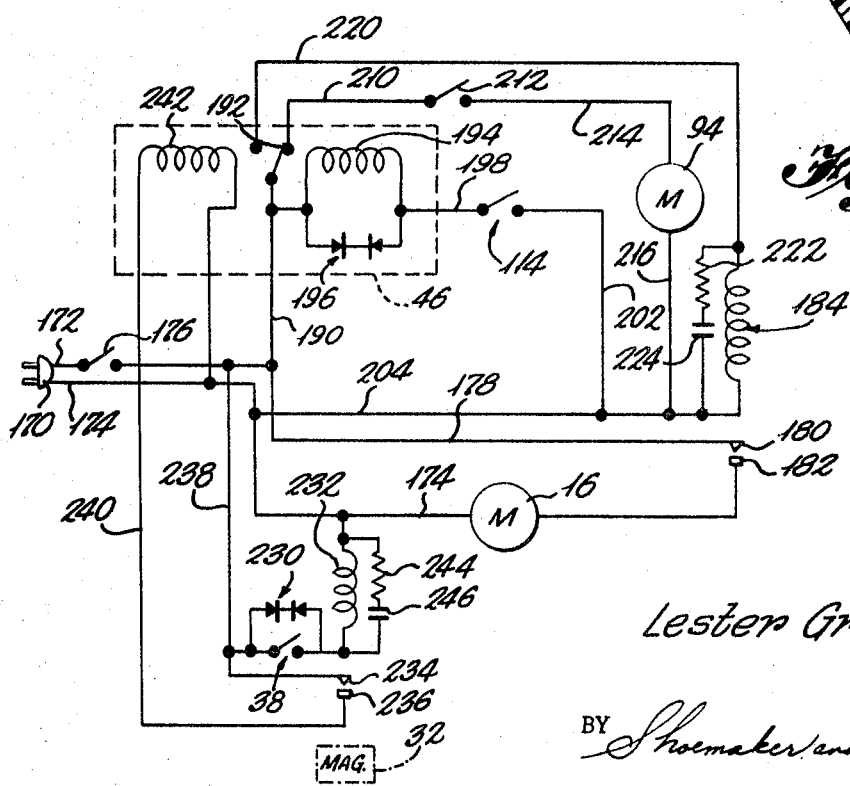

United States Patent Office 3,458,968
Patented Aug. 5, 1969

3,458,968
DISPENSING AND FEED MECHANISM
Lester Gregory, Jr., Yellville, Ark. 72687
Filed Nov. 16, 1966, Ser. No. 594,876
Int. Cl. B65b 57/20; B65g 43/08; B67b 3/26
U.S. Cl. 53—55                               11 Claims

ABSTRACT OF THE DISCLOSURE

An endless belt conveyor is provided for supporting and feeding containers to be filled by a dispensing means. A control circuit is arranged to alternately energize separate drive means of the conveyor and of the dispensing means through a switch controlled by a counter means. This switch is further controlled by a magnetic sensitive switch which is operated by magnetic means embedded in the belt conveyor. Time delay means are included in the circuit to delay the starting and stopping of the belt.

---

The present invention relates to dispensing and feeding mechanism and more particularly to apparatus for automatically filling containers with a predetermined number of articles.

The present invention is adapted to fill containers with any suitable article such as pills, bolts, or similar individual articles. Feed means in the form of an endless belt is provided for feeding containers to be filled into operative relationship relative to the dispensing mechanism of the apparatus. Means is provided on the belt for accurately positioning containers thereon, and magnetic means is embedded adjacent one edge of the belt which cooperates with a magnetic sensitive switch in the control circuit for automatically indexing the belt so that the containers to be filled are moved into the proper position.

The dispensing mechanism includes a hopper for receiving a plurality of articles to be dispensed, a feed plate being rotatably mounted at the bottom of the hopper and operatively connected with drive means therefor. One or more discharge tubes are supported at the bottom of the hopper and open in a downward direction, this discharge tube means being adapted to receive articles from the feed plate which drop downwardly through the discharge means and into a container dispensed thereunder.

An electrical control circuit is provided for automatically controlling the operation of the drive motors for the belt and the dispensing means in predetermined relationship to one another. This electrical control circuit includes a novel switch means disposed in the discharge tube for sensing the movement of articles downwardly through the discharge tube. This switch means is connected with a conventional down counter means connected in the circuit so that when a predetermined number of articles have passed downwardly through the discharge tube, the control circuit is automatically operated so as to stop the drive motor of the dispensing mechanism and to start the motor of the belt after a predetermined time delay.

The control circuit also includes a magnetic sensitive proximity switch which is adapted to be actuated by the magnetic means disposed within the belt for automatically stopping the belt at predetermined positions and for again starting the drive motor of the dispensing means when empty containers are disposed in operative position beneath the dispensing means.

Time delay means is also connected in the control circuit so that when the magnetic sensitive switch means is operated by a magnetic means in the belt, a certain time delay is afforded before the drive motor connected with the belt is stopped so that the magnetic means in the belt moves past the magnetic sensitive switch whereby the magnetic sensitive switch will not be continuously operated by the magnetic means in the belt when the belt is stopped.

An object of the present invention is to provide a new and novel dispensing and feeding mechanism for automatically filling containers with a predetermined number of articles.

Another object of the invention is the provision of dispensing and feeding mechanism which automatically indexes containers into operative position relative to dispensing mechanism so as to be filled thereby.

Still another object of the invention is to provide novel switch means disposed in the discharge tube of the dispensing means for sensing the passage of articles therethrough.

Yet another object of the invention is the provision of dispensing and feeding mechanism including an electrical control circuit for automatically controlling the drive mechanism of the dispensing means as well as the drive mechanism of the conveyor means for the containers in predetermined relationship to one another.

A still further object of the invention is to provide dispensing and feeding mechanism which is quite simple and inexpensive in construction, and yet which at the same time is quite efficient and reliable in operation.

Other objects and many attendant advantages of the invention will become more apparent when considered in connection with the specification and accompanying drawings, wherein:

FIG. 4 is a top perspective exploded view on an enlarged scale of the novel switch means associated with the discharge tube of the dispensing apparatus;

FIG. 5 is a view taken substantially along line 5—5 of FIG. 3 looking in the direction of the arrows and being on an enlarged scale; and FIG. 6 is a schematic wiring diagram illustrating an electrical control circuit operatively connected with various components of the dispensing and feeding mechanism.

Figure 1:
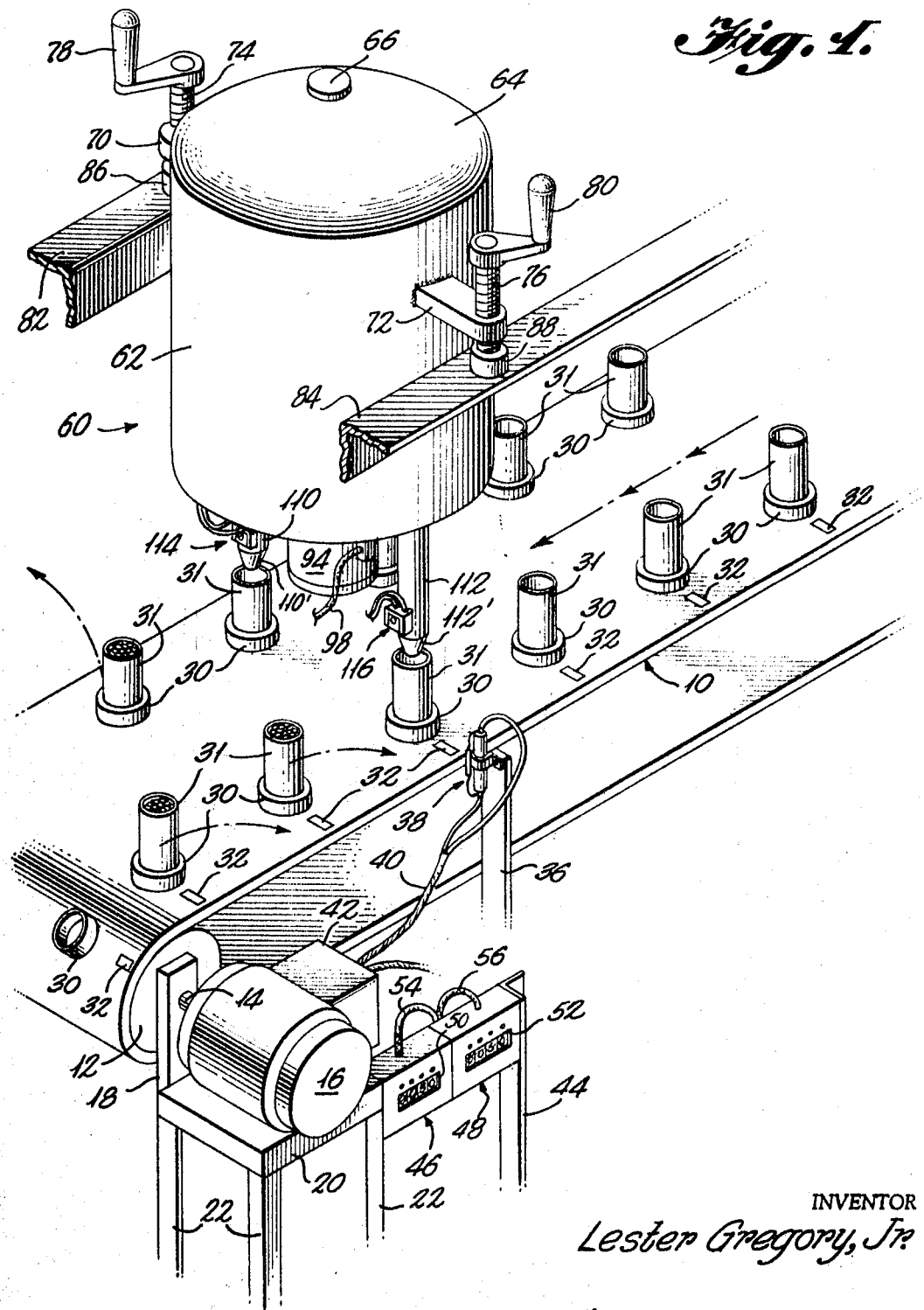
FIG. 1 is a top perspective of dispensing and feeding mechanism according to the present invention.

Referring now to the drawings wherein like reference characters designate the corresponding parts throughout the several views, and as seen most clearly in FIG. 1, means for supporting and feeding containers to be filled comprises an endless flexible conveyor belt indicated generally by reference numeral 10, this conveyor belt passing around a roller 12 which is operatively connected with the drive shaft 14 of an electric drive motor 16 provided for driving the endless belt. Shaft 14 is journalled within a suitable upright support member 18, and the motor 16 is supported upon a platform 20 having a plurality of depending leg portions 22 extending therefrom.

Means is provided on the endless belt for accurately positioning containers on the belt. This means as illustrated takes the form of a plurality of annular members 30 extending upwardly from the upper surface of the belt as seen in FIG. 1 and fixed in predetermined relationship to the belt. These annular members 30 may obviously be of different sizes to accommodate different size containers, and if required, annular shims may be provided within members 30 for enabling the annular members to snugly receive and hold therein containers of different sizes. As illustrated, a plurality of containers 31 are illustrated as being supported within annular members 30.

Figure 3:
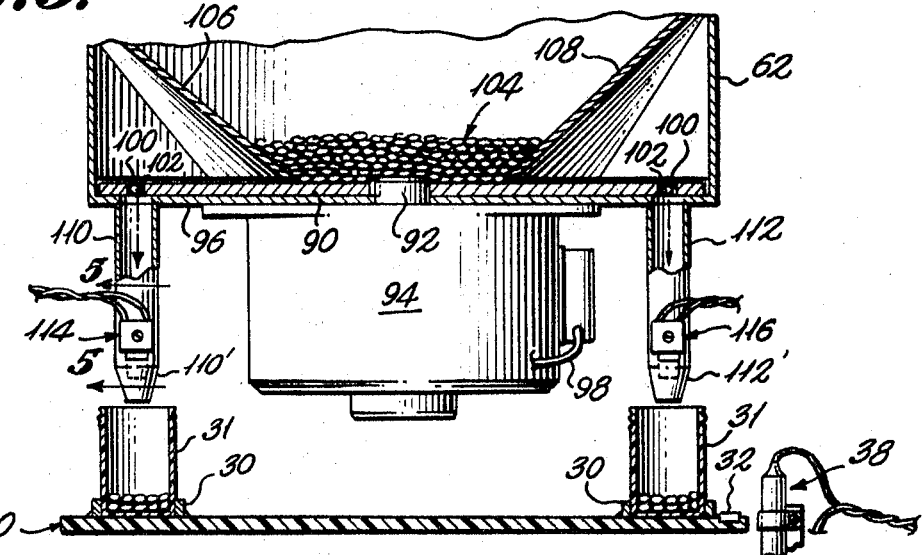
FIG. 3 is a sectional view taken substantially along line 3—3 of FIG. 2 looking in the direction of the arrows.

A plurality of spaced magnets 32 are embedded within the upper surface of the belt as seen most clearly in FIG. 3, these magnets being spaced longitudinally along a side edge portion of the belt as seen most clearly in FIG. 1. These magnets are adapted to cooperate with the magnetic sensitive switch hereinafter described for accurately indexing the movement of the belt so that the container supported thereon will be properly positioned beneath the dispensing mechanism.

As seen in FIG. 1, an upright support 36 is provided and a conventional magnetic sensitive switch 38 is supported at the upper end of support member 36, the magnetic sensitive switch being disposed adjacent to and slightly spaced from the edge of the belt so as to be operated under the influence of the magnets 32 embedded in the belt. The magnetic sensitive switch is of such a construction as to be normally open and to be closed by a magnet when the magnet is in close proximity thereto. An electric cable means 40 is provided for connecting the magnetic sensitive switch 38 with other components of the electrical control circuit disposed within a suitable housing 42 supported adjacent to motor 16.

A support member 44 extends upwardly from a suitable supporting surface and cooperates with the leg member 22 supporting portion 20 so as to support portions 46 and 48 of two conventional down counters such as type Evs 15 predetermining counters manufactured by Kessler-Ellis Products of Atlantic Highlands, N.J. In this type of counter, a pre-set total is manually set into the counter. The device, when pulsed, begins counting downward to zero. The counter is re-set back to the pre-set total by an electrical connection hereinafter described.

The counters 46 and 48 include indicator dials 50 and 52 respectively, and electric cables 54 and 56 are connected with the two counters for connecting the counters with remaining components of the electrical circuit hereinafter described.

The dispensing apparatus of the present invention is indicated generally by reference numeral 60 and includes a substantially cylindrical hopper means 62 which has a hollow interior for receiving articles such as pills to be dispensed therefrom. A domed cover 64 closes off the upper end of the hopper and is provided with a central knob 66 for lifting the cover off when desired for loading the hopper with whatever articles are to be dispensed.

A pair of lugs 70 and 72 extend radially outwardly from diametrically opposite sides of hopper 62. Screw threaded studs 74 and 76 are threaded through suitable threaded holes provided in lugs 70 and 72, the lower ends of these threaded studs extending through suitable holes provided in support rails 82 and 84 which extend longitudinally of the conveyor belt and which are suitably supported for holding the dispensing means in operative position above the belt. Handle means 78 and 80 are operatively connected with the upper ends of studs 74 and 76 respectively for rotataing these studs for adjusting the vertical position of the hopper means relative to the underlying belt. It is evident that in this manner the dispensing means may be vertically adjusted relative to the belt so that the dispensing means can be properly operatively positioned relative to the containers supported on the belt which may be of varying height. Lock washers 86 and 88 are threaded onto studs 74 and 76 for holding the dispensing mechanism in the predetermined adjusted position.

As seen most clearly in FIG. 3, a disc-like feed plate 90 is rotatably supported at the bottom of hopper 62, this feed plate being drivingly interconnected with the drive shaft 92 of a drive motor 94 suspended from the lower wall 96 of the hopper. An electric cable 98 connects drive motor 94 with remaining components of the electrical control circuit hereinafter described.

Feed plate 90 is provided with an annular row of spaced holes 100, this row of holes being spaced inwardly from the outer periphery of feed plate 90, each of the holes being adapted to receive an article to be dispensed therewithin. As seen in FIG. 3, the articles to be dispensed are illustrated as pills, a pill 102 being disposed within each of the holes 100 visible in this view, it being noted that the holes extend completely through the feed plate. A large body of loose pills is indicated by reference numeral 104, these pills being disposed within the central hollow interior portion of the hopper and being picked up by individual holes in the feed plate 90 for feeding into position over the discharge tubes associated with the hopper means. The size of the holes 100 in feed plate 90 is so dimensioned as to receive a single article to be dispensed.

Figure 2:
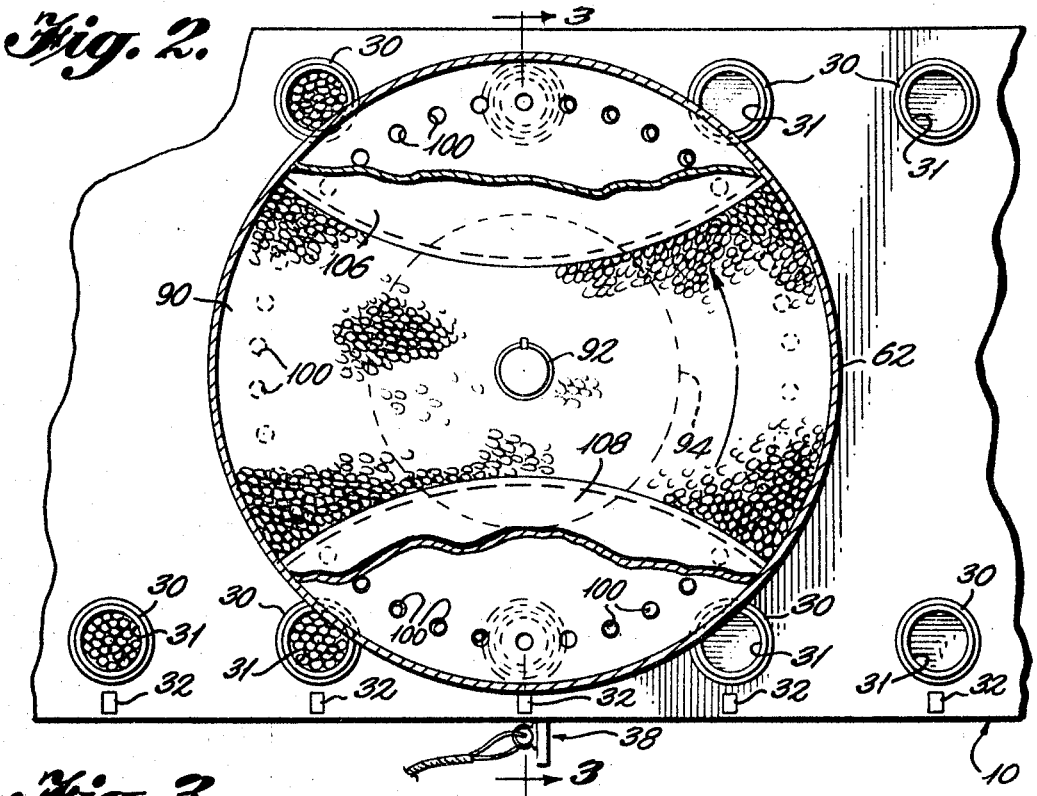
FIG. 2 is a top view of a portion of the structure shown in FIG. 1 on an enlarged scale with certain portions thereof broken away for the sake of clarity.

A pair of baffles 106 and 108 are provided within the hopper, these baffles being generally arcuate as seen from above in FIG. 2 and sloping downwardly from the side wall of the hopper toward the inner portion of the bottom of the hopper as seen in FIG. 3. It will be noted that the baffles 106 and 108 are spaced just above the feed plate 90 so as not to interfere with free rotation of the feed plate. The purpose of the baffles 106 and 108 is to ensure that as the feed plate moves thereunder, only a single pill will be carried within the baffle members by each of the holes 100 for dispensing individual pills from each of these holes.

As seen most clearly in FIG. 3, the bottom wall 96 of the hopper is provided with a pair of diametrically oppositely disposed discharge tubes 110 and 112 which extend downwardly from the hopper and which open in a downward direction for dispensing pills downwardly into suitable containers disposed therebeneath. As seen in this figure, the lower end portions 110' and 112' of discharge tubes 110 and 112 respectively are tapered downwardly, and counter switch means 114 and 116 are mounted on the discharge tubes 110 and 112 respectively, the switch blade portions of these switches extending within the tapered portions of the respective discharge tubes for sensing the movement of articles downwardly through the discharge tubes as more clearly hereinafter explained.

It will be understood that the switches 114 and 116 are of substantially identical construction, and the specific construction of these switches is illustrated most clearly in FIGS. 4 and 5. As seen in these latter two figures, the discharge tube 110 is formed of a suitable electrical insulating material such as plastic or the like and is provided with a lateral projecting portion 120 upon which may be supported or molded in place an electrically conductive member 122 having a block portion 124 extending from one face thereof and operatively connected with one end of an electrical lead 126.

Member 122 is provided with a pair of threaded holes 130. A clamping bar 132 is provided with a pair of holes 134 formed therethrough adapted to receive screws 136 which extend through holes 134 in the clamping bar and are threaded into the holes 130 of member 122. The switch includes an elongated flexible member indicated generally by reference numeral 140 having a reduced upper end portion 142 which is adapted to be clamped between the clamping bar 132 and member 122 whereby the upper end of member 140 is electrically connected with lead 126. Flexible member 140 which is formed of an electrically conductive material includes an enlarged intermediate portion 144 which joins with a lower portion 146 extending downwardly therefrom at an obtuse angle thereto, portion 146 extending through a hole 148 provided in the wall of the discharge tube 110. It will be noted that the lower end of portion 146 of the flexible member is adapted to be engaged by articles dropping downwardly within the discharge tube, portion 146, being adapted to flex downwardly into the phantom line position seen in FIG. 5 to allow discharged articles to pass thereby. It will be understood that the flexible member is of such thickness and dimension so as to be readily flexed by the weight of the dispensed articles.

The upper portion of flexible member 140 is provided with a hole formed therethrough and a nut 150 is suitably secured as by soldering thereto, the nut being adapted to receive the threaded shank portion 152 of a movable contact including an enlarged contact head 154. It is apparent that this arrangement enables the movable contact to be adjusted relative to flexible member 140. A flexible dust guard 158 is provided with a central hole 160 adapted to snugly fit about the shank portion 152 of the movable contact, the peripheral portions of dust guard 158 being disposed within surrounding portions of the projection 120 of the discharge tube and the member 122 provided with grooves for receiving the dust guard. The dust guard 158 is formed of suitable material such as rubber or the like whereby it is sufficiently flexible so as not to interfere with movement of the movable contact, and yet at the same time to ensure that a dust-free arrangement is provided so that dust or other foreign matter does not enter the space between the movable and fixed contacts hereinafter described.

A flat plate 164 is suitably fixed in place as by being embedded within the material of projection 120, plate 164 being formed of electrically conductive material. A fixed contact 166 is secured to plate 164 and is adapted to engage the contact head 154 of the movable contact. As illustrated particularly in FIG. 5, the fixed and movable contacts are normally in engagement with one another so that the switch means is normally closed. As seen most clearly in FIG. 4, the upper end of the plate 164 is operatively connected with a second electrical lead 168. It is noted that the members operatively connected with the fixed and movable contacts are insulated from one another with the arrangement illustrated, and the only electrical connection is provided between the enlarged contact head 154 of the movable contact and the fixed contact.

Referring now to FIG. 6 of the drawings, the schematic wiring diagram illustrates an electrical control circuit operatively connected with certain components previously described. The electric motors 16 and 94 for driving the endless belt and the feed plate of the dispensing means respectively are illustrated in this diagram. A typical magnet 32 is embedded as embedded in the belt as indicated in phantom line by reference numeral 32, and the magnetic sensitive switch 38 is also shown. One of the counters 46 is illustrated in dotted line, and one of the counter switch means 114 is also illustrated.

A plug 170 is adapted to be plugged into a suitable source of electrical energy such as 110 volts AC, the plug being connected with a pair of leads 172 and 174. A master switch 176 which is adapted to be manually operated is provided, this switch being mounted in any suitable position preferably upon the housing 42 previously described for turning the control circuit on or off.

Lead 172 is connected with a lead 178 which is in turn connected with a switch means including contacts 180 and 182, these contacts comprising portions of a relay including the coil 184 as more fully hereinafter described. The contacts 180 and 182 are adapted to close the circuit through the drive motor 16 for the conveyor belt.

Lead 172 is also connected by lead 190 with switch means 192 in the counter 46. Lead 190 is connected with a coil 194 in the counter which controls operation of switch 192, coil 194 being connected in parallel with an arc suppressor indicated generally by reference numeral 196. Coil 194 is further connected by lead 198 with the counter switch means 114 previously described in detail. This counter switch means is further connected by leads 202 and 204 to lead 174 for completing the circuit through the counter and the counter switch means.

In the position illustrated in FIG. 6, switch means 192 is in position to close the circuit through lead 210 to a manually operated switch 212 which in turn is connected by means of lead 214 with the drive motor 94 of the feed plate of the dispensing means. The opposite side of the drive motor is connected by a lead 216 to the lead 204 whereby with switches 192 and 212 in the closed position the circuit is closed through motor 94.

Switch 192 is movable into a second position wherein it closes a circuit through lead 220 and thence through the coil 184 previously described. A resistor 222 and a capacitor 224 are connected in parallel with coil 184 to provide a time delay means whereby the operation of the relay including coil 184 is delayed for a predetermined time interval which in the present case may be approximately 300 milliseconds.

The magnetic sensitive switch 38 is connected in parallel with an arc suppressor indicated by reference numeral 230, the magnetic switch when closed being adapted to close the circuit through the coil 232 of a relay switch means including contacts 234 and 236, these contacts being normally open. When the contacts 234 and 236 are closed, a circuit is closed through leads 238 and 240 to the counter reset coil 242 which is adapted to move the switch 192 from the position shown in FIG. 6 into the position wherein a circuit is closed through lead 220. A resistor 244 and a capacitor 246 are connected in parallel with the coil 232 so that a time delay means is provided before the relay including contacts 234 and 236 closes, this time delay in the present invention being on the order of 300 milliseconds.

The operation of the control circuit illustrated in FIG. 6 is hereinafter described. Let us assume that the containers supported by the endless belt are in position to receive articles from the dispensing mechanism. With the master switch 176 closed and with the switch 114 which is normally closed also being closed, a circuit is completed through the down counter coil 194. The switch 192 is in position to close the circuit through lead 210 and the manual switch 212 which is also closed whereby motor 94 is operated so as to rotate feed plate 90 whereby pills are dispensed downwardly through the discharge tubes.

As the individual articles pass downwardly through a discharge tube, the counter switch means operatively associated with the tube will be periodically opened so as to pulse the counter whereupon the counter starts to count downwardly from the pre-set total. When the counter reaches zero and the desired number of articles have passed downwardly through the discharge tube, switch 192 automatically moves to the position closing the circuit through lead 220. This causes the motor 94 to cease operation since the circuit therethrough is broken, and the circuit is completed through the coil 184. The components 222 and 224 provide a time delay so as to allow the last dispensed article to drop downwardly from the associated discharge tube into a container therebeneath. Contacts 180 and 182 then close to start motor 16 whereupon the endless belt will be advanced so as to bring the next empty container into position beneath the dispensing means.

When a magnet 32 in the belt moves into proximity with the normally open magnetic switch 38, the switch 38 is closed thereby closing the circuit through coil 232. A time delay then occurs before the contacts 234 and 236 close to permit the belt to advance to a point where the magnetic sensitive switch 38 will not be held closed by the magnet when the belt is stopped.

After the predetermined time delay, contacts 234 and 236 close to close the circuit through the counter reset coil 242 so as to move the switch 192 back to the position where it closes the circuit through lead 210 and opens the circuit through lead 220. This causes the contacts 180 and 182 to open thereby opening the circuit through motor 16 and stopping the belt, while at the same time the circuit is closed through motor 94 so that the feed plate of the dispensing mechanism will again be actuated.

The aforementioned cycle of operation will continue to repeat itself automatically once the operation of the apparatus is initiated.

As seen in FIG. 1, it is apparent that the containers to the right of the discharge tubes 110 and 112 are empty, while the containers beneath the discharge tubes are to be filled therefrom, while the containers to the left of this position are already filled. As indicated schematically by the arrows, the filled containers are suitably removed from the conveyor belt before it goes around roller 12. Any suitable automatic mechanism for removing the filled containers may be employed.

It is apparent from the foregoing that there is provided according to the present invention new and novel dispensing and feeding mechanism which is especially adapted for automatically filling containers with a predetermined number of articles. The apparatus includes means for accurately indexing the containers into position beneath the dispensing means to be filled thereby. Novel switch means is provided in the discharge tube associated with the dispensing means for sensing the passage of dispensed articles through the discharge tube. A unique electrical control circuit is operatively connected with the various components of the dispensing and feeding mechanism for controlling the drive mechanism of the dispensing means as well as the drive mechanism of the feeding means in predetermined relationship to one another. The apparatus is quite simple and inexpensive in construction, and yet at the same time is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the alternate operation of said feeding means and said dispensing means in predetermined relationship to one another, said control means including counter means, said counter means being connected with counter switch means operatively associated with said discharge tube for sensing the movement of articles through said discharge tube, said feeding means including an endless belt, drive means for driving said endless belt, said dispensing means including hopper means for holding articles to be dispensed, feed plate means movably mounted within said hopper means, drive means for said feed plate means, said control means including separate time delay switch means for controlling the operation of each of said drive means.

2. Apparatus as defined in claim 1 wherein said counter switch means includes a fixed contact, a movable contact, an elongated flexible member extending into said discharge tube for engagement by articles passing therethrough, said movable contact being adjustably mounted on said elongated flexible member.

3. Apparatus as defined in claim 2 including dust guard means disposed in surrounding relation to a portion of said movable contact for preventing foreign matter from entering the space between the contact portions of the fixed and movable contacts.

4. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said feeding means including an endless belt, drive means for driving said endless belt, said dispensing means including hopper means for holding articles to be dispensed, feed plate means movably mounted within said hopper means, drive means for said feed plate means, said control means including switch means for controlling the operation of each of said drive means, said counter means including switch means for alternatively actuating the belt drive means or the feed plate means drive means, and means for moving said last-mentioned switch means into one of two operative positions.

5. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said feeding means including an endless belt, drive means for driving said endless belt, said dispensing means including hopper means for holding articles to be dispensed, feed plate means movably mounted within said hopper means, drive means for said feed plate means, said control means including switch means for controlling the operation of each of said drive means, and magnetic operative switch means adapted to be operated by magnetic means carried by said belt, said counter means including switch means for controlling the operation of each of said drive means, coil means for controlling the position of said last-mentioned switch means, said magnetic sensitive switch means being operatively connected with said coil means.

6. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said feeding means including an endless belt, drive means for driving said endless belt, said dispensing means including hopper means for holding articles to be dispensed, feed plate means movably mounted within said hopper means, drive means for said feed plate means, said control means including switch means for controlling the operation of each of said drive means, said counter means including switch means for alternatively operating said belt drive means or said feed plate means drive means, said counter means including coil means for moving said last-mentioned switch means into one operative position, second coil means for moving said last-mentioned switch means into a second operative position, magnetic sensitive switch means, additional switch means for closing a circuit through said second coil means, said magnetic sensitive switch means controlling the operation of said additional switch means.

7. Apparatus as defined in claim 6 including time delay means for closing the circuit through the belt drive means.

8. Apparatus as defined in claim 6 including time delay means operatively connected with said magnetic sensitive switch means.

9. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said feeding means comprising an endless belt, means on said belt for accurately positioning containers thereon, a drive motor for driving said belt, said belt having magnetic means adjacent an edge portion thereof at spaced portions thereof for accurately indexing movement of the belt.

10. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said dispensing means including a hopper means for receiving articles to be dispensed, feed plate means rotatably mounted at the bottom of said hopper means and having at least one hole therein adapted to be aligned with said discharge tube, a drive motor for rotating said feed plate means, baffle means disposed over said discharge tube for preventing an excessive build-up of articles over said hole in said feed plate means, said counter switch means extending into said discharge tube adjacent the lower portion thereof.

11. Dispensing and feed mechanism including means for supporting and feeding containers to be filled, means for dispensing articles into containers supported by said feeding means, said dispensing means including a discharge tube open at the lower end thereof and adapted to be positioned over a container supported by said feeding means, and control means for controlling the operation of said feeding means and said dispensing means in predetermined relationship to one another, said control means including counter means, said counter means being connected with counter switch means operatively associated with said discharge tube for sensing the movement of articles through said discharge tube, said feeding means comprising an endless belt, a drive motor operatively connected with said belt for moving the belt, spaced magnetic means supported by the belt for accurately indexing movement of the belt, means for accurately positioning containers on the belt in predetermined relationship to said magnetic means, said dispensing means including a hopper means for receiving articles to be dispensed, a feed plate rotatably supported at the bottom of said hopper means and having a hole formed therethrough adapted to be aligned with the upper end of said discharge tube, baffle means over said feed plate means above said discharge tube for preventing excessive build-up of articles to be dispensed on said feed plate, said counter switch means including an elongated flexible member extending within said discharge tube for engagement by articles dropping downwardly through said tube under the influence of gravity, said control means including an electrical network having said counter means connected therein, said counter means including switch means for alternatively energizing the drive motor for said belt and the drive motor for said feed plate, said counter means including a first coil for moving said last-mentioned switch means to one operative position for energizing one of said motors, a second coil for moving said last-mentioned switch means to a second position to energize the other of said motors, means for producing a time delay in energizing said other of said motors, magnetic sensitive switch means positioned adjacent a portion of said belt and adapted to be actuated by the magnetic means supported by said belt, additional switch means adapted to close a circuit to said second coil, said magnetic sensitive switch causing said additional switch to close to operate said second coil and to move said switch means of the counter means into a second operative position.

References Cited

UNITED STATES PATENTS

| | | | |
|---|---|---|---|
| 2,203,508 | 6/1940 | Rosenthal | 198—232 |
| 2,864,215 | 12/1958 | Hillman | 53—78 X |
| 3,018,595 | 1/1962 | Harris et al. | 53—78 |
| 3,279,574 | 10/1966 | Selden | 194—9 |

THERON E. CONDON, Primary Examiner

R. L. SPRUILL, Assistant Examiner

U.S. Cl. X.R.

53—78; 198—232